United States Patent
Nakasu et al.

(10) Patent No.: US 11,518,028 B2
(45) Date of Patent: Dec. 6, 2022

(54) TRAJECTORY GENERATION DEVICE, TRAJECTORY GENERATION METHOD, PROGRAM, AND ROBOT SYSTEM

(71) Applicant: Hitachi, Ltd., Tokyo OT (JP)

(72) Inventors: Nobuaki Nakasu, Tokyo (JP); Yuta Yamauchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 479 days.

(21) Appl. No.: 16/678,217

(22) Filed: Nov. 8, 2019

(65) Prior Publication Data
US 2020/0306965 A1 Oct. 1, 2020

(30) Foreign Application Priority Data

Mar. 26, 2019 (JP) .............................. JP2019-058257

(51) Int. Cl.
 *B25J 9/16* (2006.01)
 *B25J 15/06* (2006.01)
(52) U.S. Cl.
 CPC ........... *B25J 9/1664* (2013.01); *B25J 9/1628* (2013.01); *B25J 9/1697* (2013.01); *B25J 15/0616* (2013.01)
(58) Field of Classification Search
 CPC ...... B25J 9/1664; B25J 9/1628; B25J 9/1697; B25J 15/0616; B25J 9/161; B25J 19/04; G05B 19/042; Y02P 90/02
 See application file for complete search history.

(56) References Cited

U.S. PATENT DOCUMENTS

| | | | | |
|---|---|---|---|---|
| 9,415,511 | B2* | 8/2016 | Gotou | B25J 9/1697 |
| 9,975,244 | B1* | 5/2018 | Nagarajan | B25J 9/1664 |
| 10,035,266 | B1* | 7/2018 | Kroeger | B25J 9/1664 |
| 2003/0108415 | A1* | 6/2003 | Hosek | B25J 9/1664 |
| | | | | 414/217 |
| 2011/0224815 | A1* | 9/2011 | Sonner | B25J 9/1664 |
| | | | | 700/97 |
| 2017/0173790 | A1* | 6/2017 | Tan | B25J 11/00 |
| 2019/0030727 | A1* | 1/2019 | Nagata | B25J 9/1697 |

FOREIGN PATENT DOCUMENTS

JP 2017-220538 A 12/2017

* cited by examiner

*Primary Examiner* — Adam R Mott
*Assistant Examiner* — Elizabeth Rose Neleski
(74) *Attorney, Agent, or Firm* — Mattingly & Malur, PC

(57) ABSTRACT

A trajectory generation device generates a trajectory of a robot for conveying an object. A path condition acquisition unit acquires path condition information including at least coordinates of a first via point which is a position of a reference point of a suction nozzle of the robot when the suction nozzle comes into contact with the object, and a velocity, an acceleration, and a jerk of the suction nozzle at the first via point. A pressurization distance and coordinate calculation unit calculates coordinates of a second via point which is a position of the reference point when the suction nozzle is pushed into the object, based on the path condition information; and a trajectory generation unit generates the trajectory of the suction nozzle which satisfies the path condition information and reaches an end point from a predetermined start point via the first via point and the second via point.

11 Claims, 12 Drawing Sheets

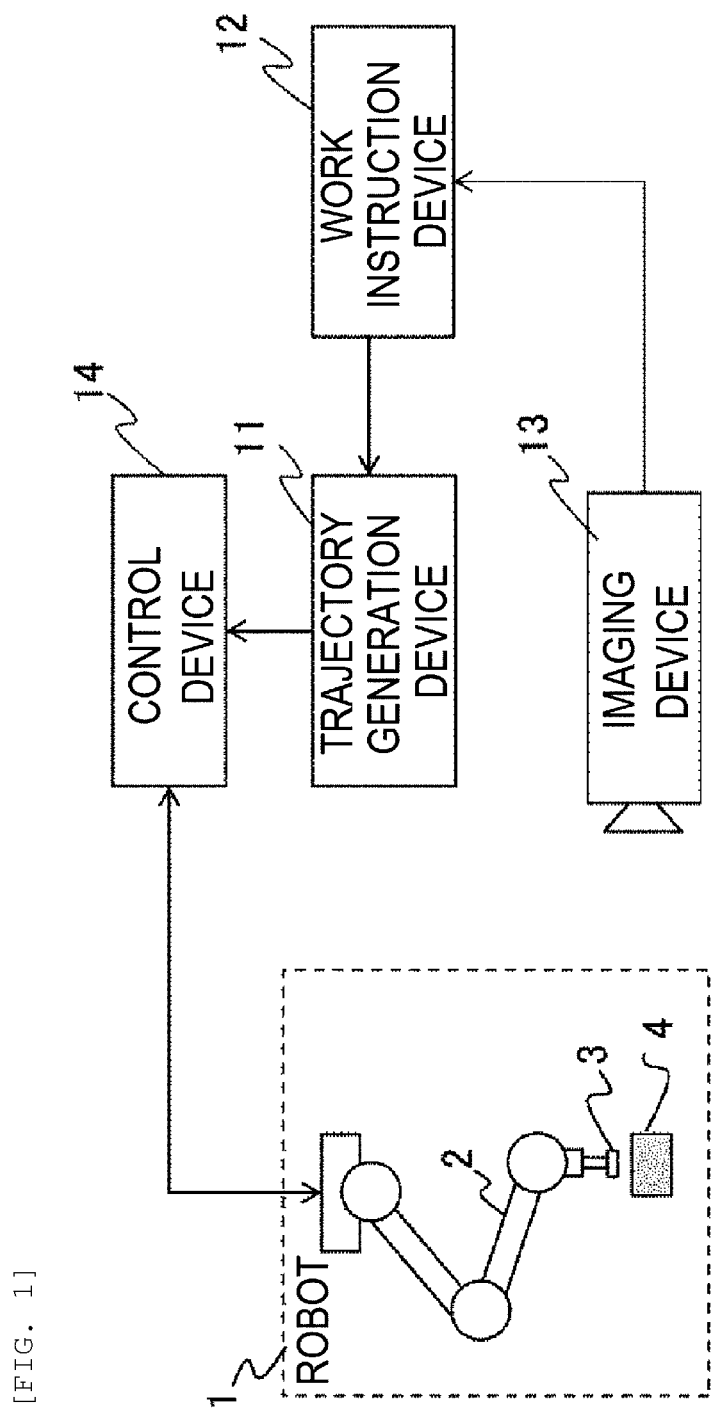
[FIG. 1]

[FIG. 2]
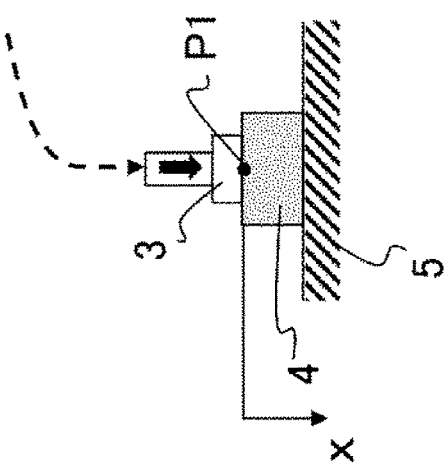
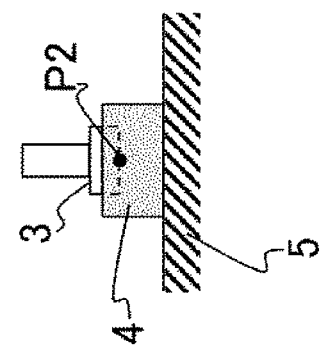
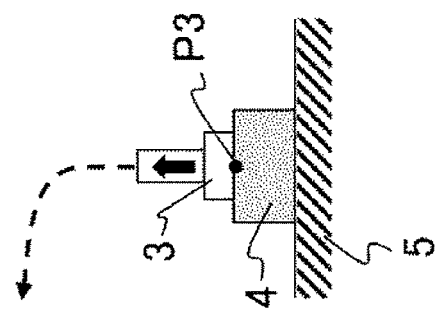

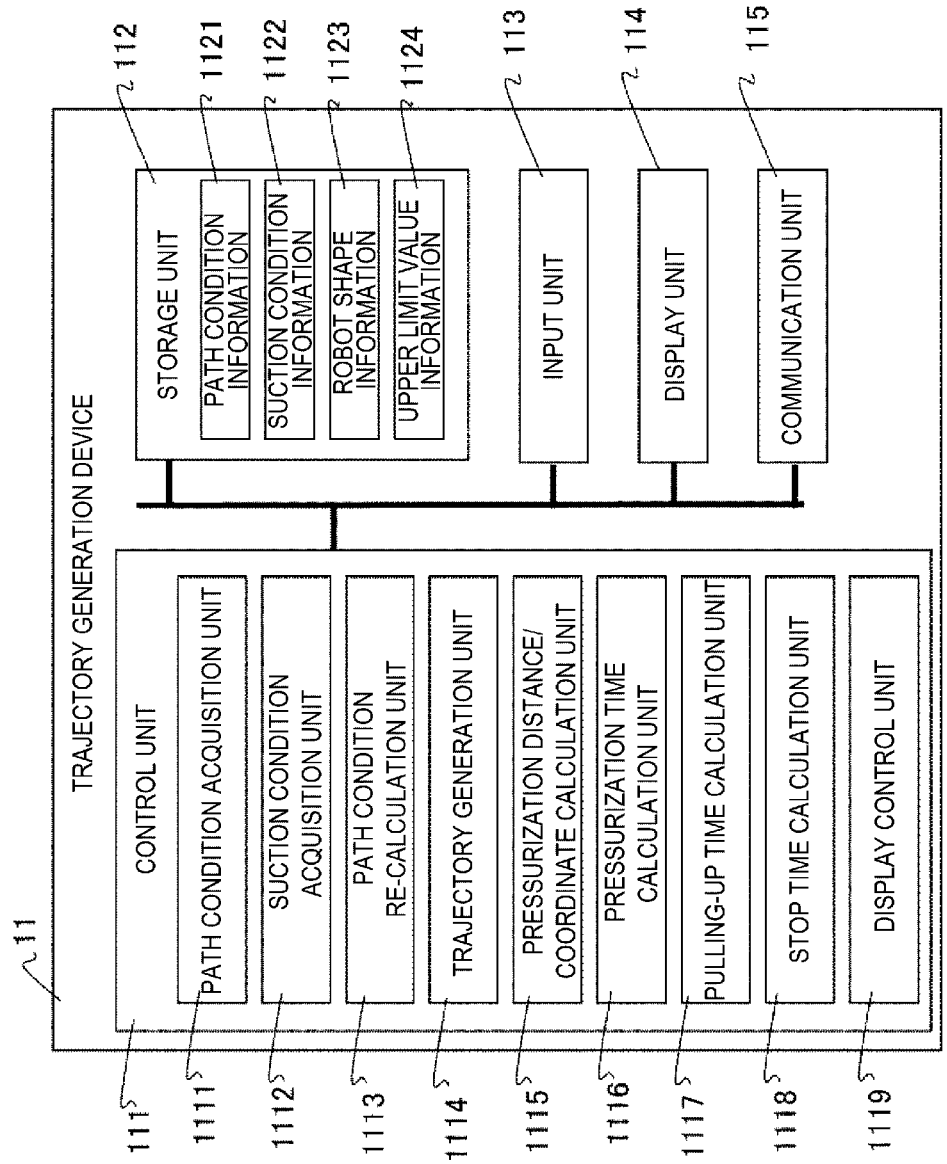
[FIG. 3]

| VIA POINT | ITEM | EXAMPLE |
|---|---|---|
| FIRST | COORDINATES/POSTURE | $(x_1, y_1, z_1, \phi_1, \theta_1, \psi_1)$ |
| | VELOCITY VECTOR | $V_1 = (v_{1x}, v_{1y}, v_{1z})$ |
| | ACCELERATION VECTOR | $A_1 = (a_{1x}, a_{1y}, a_{1z}) = a_1 \cdot \frac{1}{|V_1|} V_1$ |
| | JERK VECTOR | $J_1 = (j_{1x}, j_{1y}, j_{1z}) = j_1 \cdot \frac{1}{|V_1|} V_1$ |
| | MAXIMUM ACCELERATION | $A_{1max} = (a_{1xm}, a_{1ym}, a_{1zm}) = a_{1max} \cdot \frac{1}{|V_1|} V_1$ |
| | MAXIMUM JERK | $J_{1max} = (j_{1xm}, j_{1ym}, j_{1zm}) = j_{1max} \cdot \frac{1}{|V_1|} V_1$ |
| THIRD | COORDINATES/POSTURE | $(x_3, y_3, z_3, \phi_3, \theta_3, \psi_3)$ |
| | VELOCITY VECTOR | $V_3 = (v_{3x}, v_{3y}, v_{3z})$ |
| | ACCELERATION VECTOR | $A_3 = (a_{3x}, a_{3y}, a_{3z}) = a_3 \cdot \frac{1}{|V_3|} V_3$ |
| | JERK VECTOR | $J_3 = (j_{3x}, j_{3y}, j_{3z}) = j_3 \cdot \frac{1}{|V_3|} V_3$ |
| | MAXIMUM ACCELERATION | $A_{3max} = (a_{3xm}, a_{3ym}, a_{3zm}) = a_{3max} \cdot \frac{1}{|V_3|} V_3$ |
| | MAXIMUM JERK | $J_{3max} = (j_{3xm}, j_{3ym}, j_{3zm}) = j_{3max} \cdot \frac{1}{|V_3|} V_3$ |

[FIG. 5]

| ITEM | EXAMPLE |
|---|---|
| SUCTION TIME | $t_v$ |

| LINK No | LINK LENGTH (mm) | MOVABLE RANGE (DEGREE) | MODEL NAME |
|---|---|---|---|
| 1 | 100 | -200~200 | Link1.stl |
| 2 | 150 | -150~150 | Link2.stl |
| 3 | 200 | -150~150 | Link3.stl |
| 4 | 100 | -200~200 | Link4.stl |
| 5 | 110 | -90~180 | Link5.stl |
| 6 | 50 | -300~300 | Link6.stl |

| WEIGHT OF OBJECT TO BE CONVEYED | COORDINATES/POSTURE | | | | | | ACCELERATION DIRECTION | | | | | | UPPER LIMIT OF ACCELERATION | UPPER LIMIT OF JERK |
|---|---|---|---|---|---|---|---|---|---|---|---|---|---|---|
| | x | y | z | $\phi$ | $\theta$ | $\psi$ | x | y | z | $\phi$ | $\theta$ | $\psi$ | | |
| 2kg | 100 | 0 | 300 | 0 | 0 | 0 | 1 | 0 | 0 | 0 | 0 | 0 | 1000 | ... |
| 4kg | 100 | 0 | 300 | 0 | 0 | 0 | 0 | 1 | 0 | 0 | 0 | 0 | 800 | ... |
| ... | | | | | | | ... | | | | | | ... | |

1124

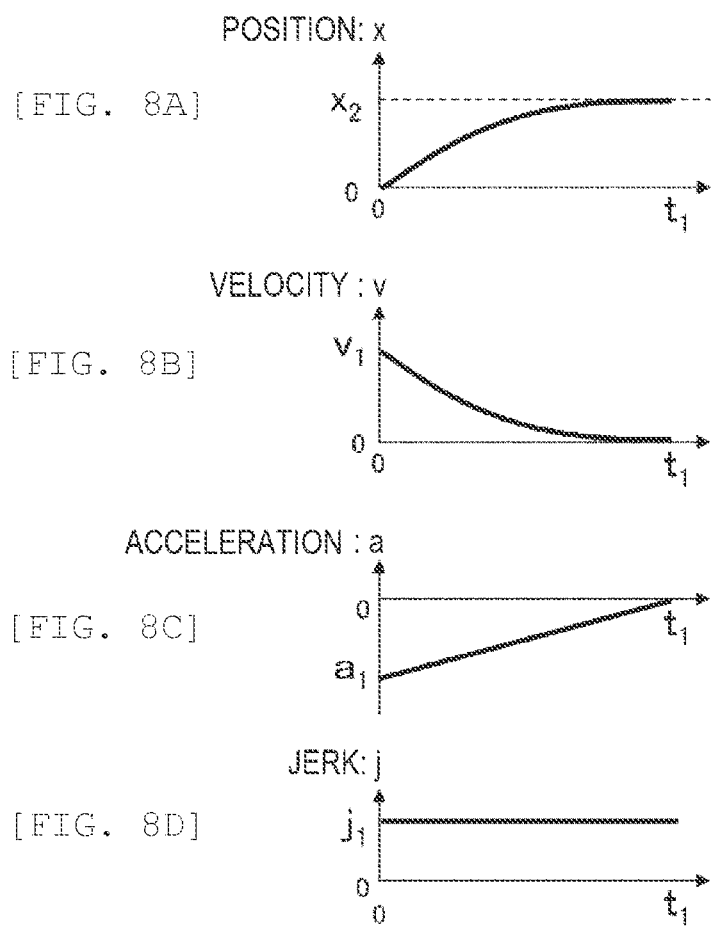

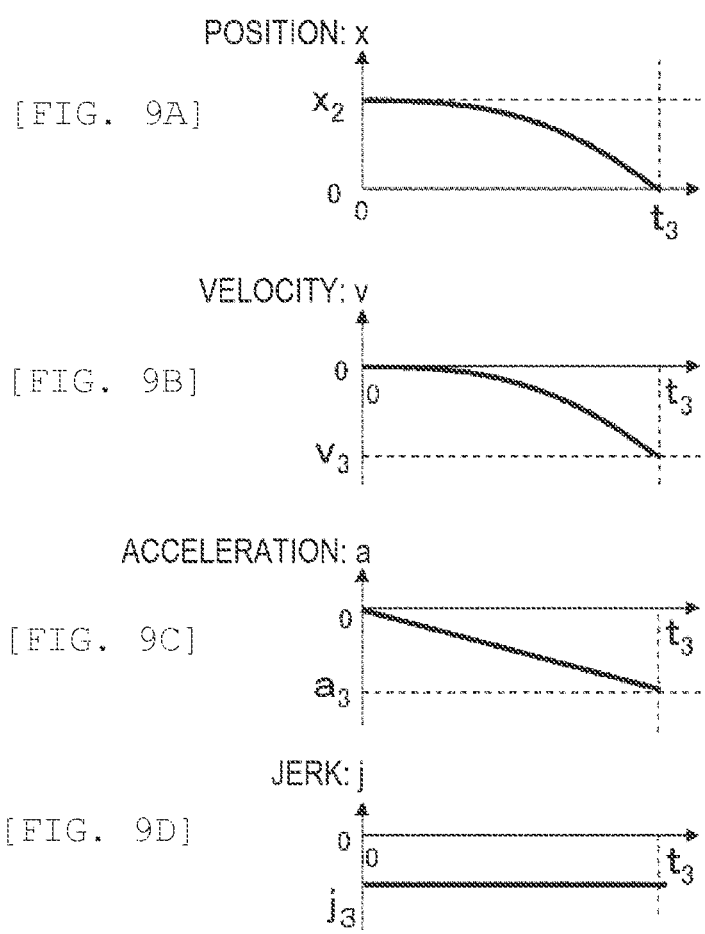

[FIG. 10]
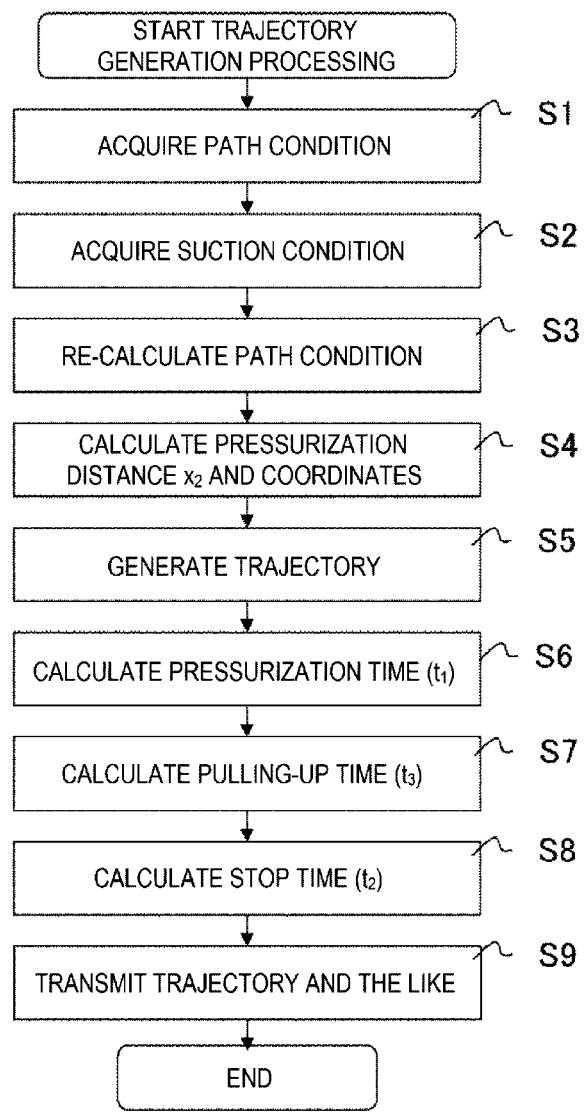

[FIG. 11]
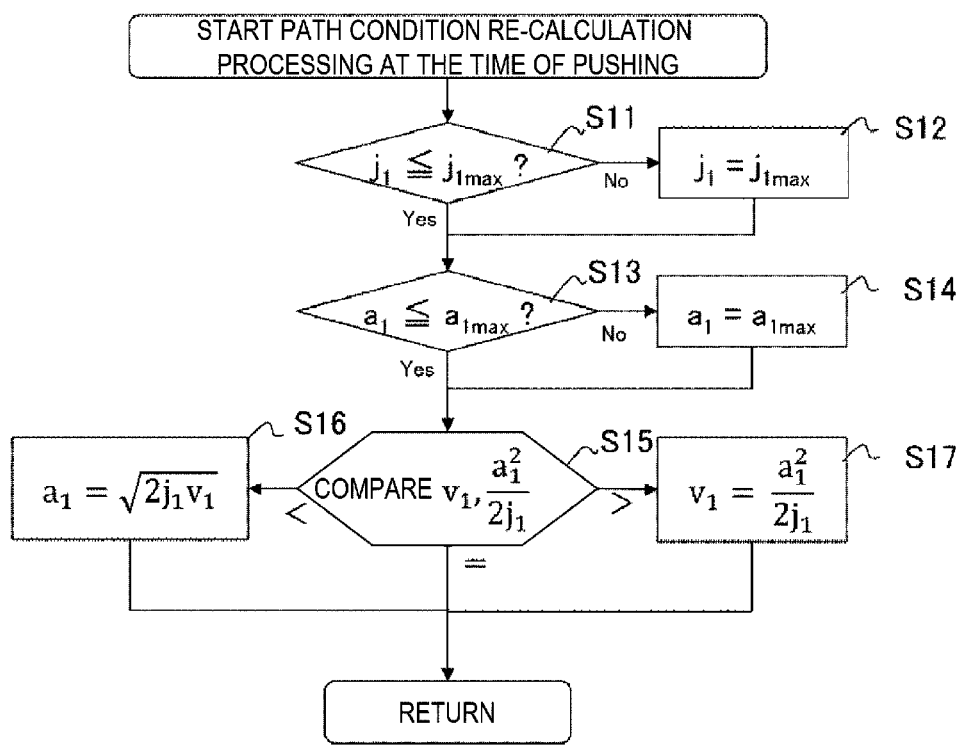

[FIG. 12]
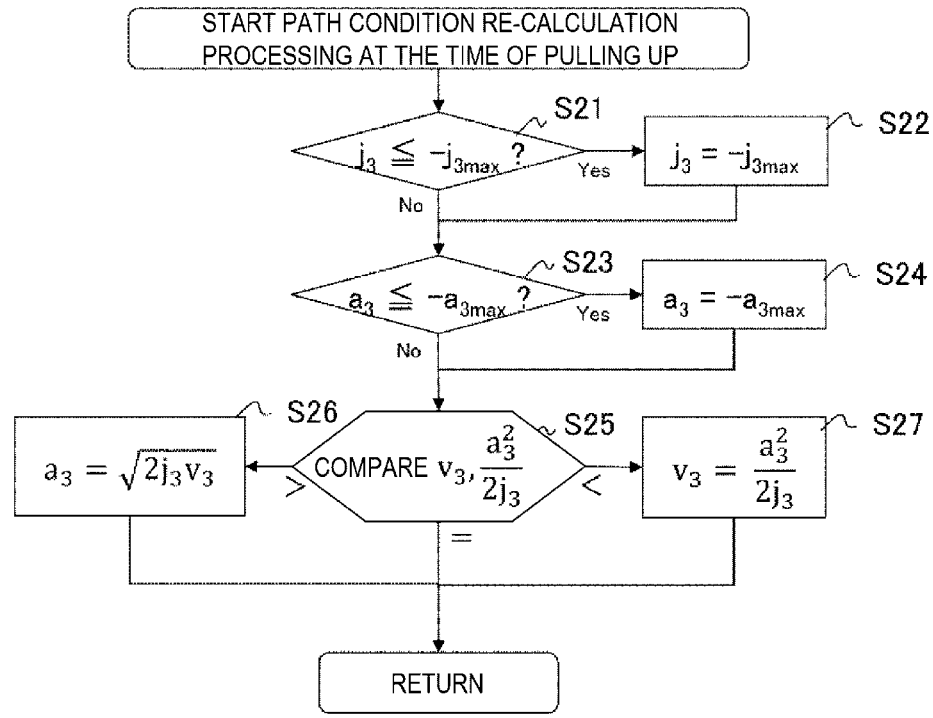
[FIG. 13]
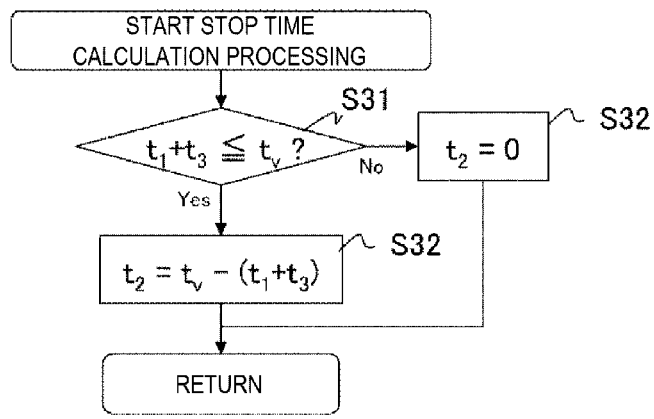

[FIG. 14]
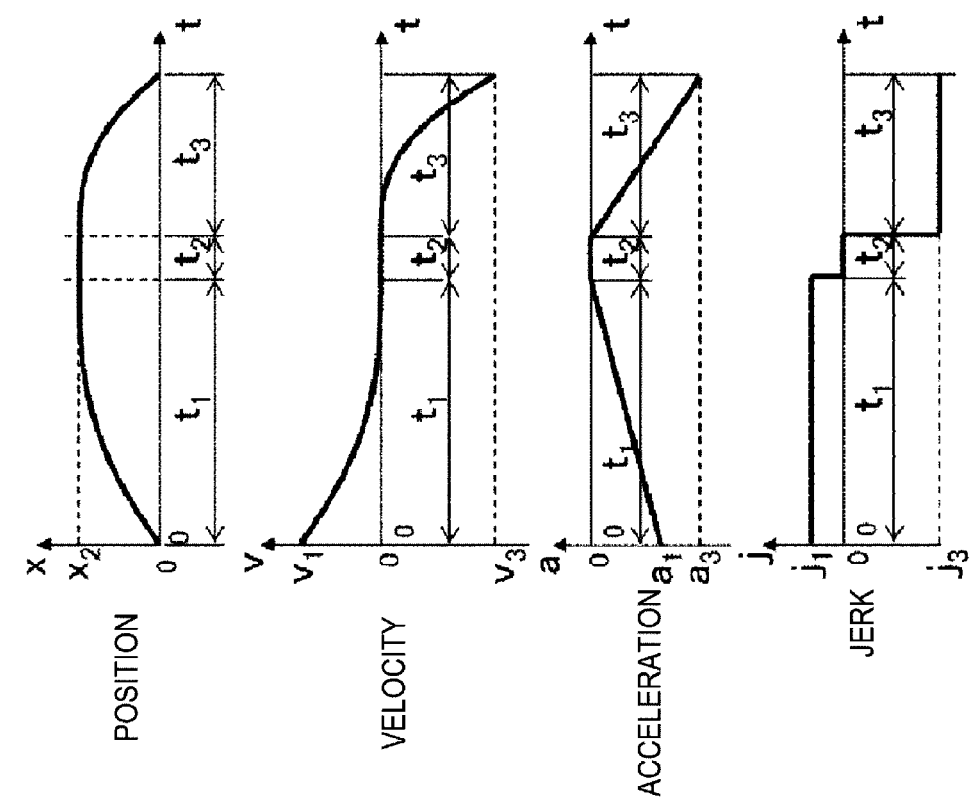

TRAJECTORY GENERATION DEVICE, TRAJECTORY GENERATION METHOD, PROGRAM, AND ROBOT SYSTEM

CROSS-REFERENCE TO RELATED APPLICATION

The present application claims priority from Japanese application JP 2019-058257, filed on Mar. 26, 2019, the contents of which is hereby incorporated by reference into this application.

TECHNICAL FIELD

The present invention relates to a trajectory generation device, a trajectory generation method, a program, and a robot system.

BACKGROUND ART

When an object is conveyed using a suction nozzle mounted on an arm of a robot, it is necessary to control a velocity of the suction nozzle so as not to damage the object with the suction nozzle.

PTL 1 describes "a component mounting device, including: a component suction nozzle configured to suction a component and mount the component on a substrate; a nozzle drive unit configured to operate the component suction nozzle; and a nozzle drive control unit configured to control the nozzle drive unit, wherein the nozzle drive control unit lowers the component suction nozzle at a first velocity to a first height which is higher than a mounting height, and lowers the component suction nozzle at a second velocity which is slower than the first velocity from the first height to the mounting height, and mounts the component on the substrate, and the nozzle drive control unit changes the first height in accordance with a type of the substrate on which the component is to be mounted".

PRIOR ART LITERATURE

Patent Literature

PTL 1: JP-A-2017-220538

SUMMARY OF INVENTION

Technical Problem

In the component mounting device described in PTL 1, the impact when the component suction nozzle comes into contact with the component can be reduced. However, when an approach distance at a low velocity is short and a height of the component is changed, since the suction nozzle comes into contact with the component at a high velocity, the component may be damaged by the component suction nozzle. In addition, in the component mounting device, no consideration is given to shortening the time required for moving the component suction nozzle.

In addition, in the related control for the robot, after the suction nozzle is pressed against the object, the suction nozzle is stopped only for a sufficient time until suction pressure of the suction nozzle rises. This stop time is a factor for increasing the time required for a series of object suction operations until the object is suctioned and conveyed by the suction nozzle.

The invention has been made in view of the above circumstances, and an object thereof is to shorten the time required for a series of object suction operations.

Solution to Problem

The present application includes a plurality of means for solving at least a part of the problems described above, and an example of the plurality of means is as follows.

In order to solve the above problem, according to an aspect of the invention, there is provided a trajectory generation device which generates a trajectory of a robot for conveying an object, the trajectory generation device including a path condition acquisition unit configured to acquire path condition information including at least coordinates of a first via point which is a position of a reference point of a suction nozzle of the robot when the suction nozzle comes into contact with the object, and a velocity, an acceleration, and a jerk of the suction nozzle at the first via point; a pressurization distance and coordinate calculation unit configured to calculate coordinates of a second via point which is a position of the reference point when the suction nozzle is pushed into the object, based on the path condition information; and a trajectory generation unit configured to generate the trajectory of the suction nozzle which satisfies the path condition information and reaches an end point from a predetermined start point via the first via point and the second via point.

Advantageous Effect

According to one aspect of the invention, it is possible to shorten the time required for the series of object suction operations.

Problems, configurations, and effects other than those described above will become apparent from the following description of the embodiments.

BRIEF DESCRIPTION OF DRAWINGS

FIG. 1 is a diagram showing a configuration example of a robot system according to an embodiment of the invention.

FIG. 2 is a diagram for illustrating an outline of a movement of a suction nozzle of a robot.

FIG. 3 is a functional block diagram showing a configuration example of a trajectory generation device.

FIG. 4 is a diagram showing an example of path condition information.

FIG. 5 is a diagram showing an example of suction condition information.

FIG. 6 is a diagram showing an example of robot shape information.

FIG. 7 is a diagram showing an example of upper limit value information.

FIGS. 8A to 8D are diagrams for illustrating an example of a trajectory along which the suction nozzle moves from a first via point to a second via point, wherein FIG. 8A is a diagram showing a time-series change of an x-coordinate of the suction nozzle, FIG. 8B is a diagram showing a time-series change of a velocity of the suction nozzle, FIG. 8C is a diagram showing a time-series change of an acceleration of the suction nozzle, and FIG. 8D is a diagram showing a time-series change of a jerk of the suction nozzle.

FIGS. 9A to 9D are diagrams for illustrating an example of a trajectory along which the suction nozzle moves from the second via point to a third via point, wherein FIG. 9A is a diagram showing the time-series change of an x-coordinate of the suction nozzle, FIG. 9B is a diagram showing the time-series change of the velocity of the suction nozzle, FIG. 9C is a diagram showing the time-series change of the acceleration of the suction nozzle, and FIG. 9D is a diagram showing the time-series change of the jerk of the suction nozzle.

FIG. 10 is a flowchart illustrating an example of trajectory generation processing by the trajectory generation device.

FIG. 11 is a flowchart illustrating an example of path condition re-calculation processing at the time of pushing.

FIG. 12 is a flowchart illustrating an example of the path condition re-calculation processing at the time of pulling-up.

FIG. 13 is a flowchart illustrating an example of stop time calculation processing.

FIG. 14 is a diagram showing a display example of an output screen.

DESCRIPTION OF EMBODIMENTS

An embodiment of the invention will be described below with reference to the drawings. In all the drawings for describing the present embodiment, the same reference sign is attached to the same member in principle, and the repetitive description thereof will be omitted. In addition, in the following embodiments, it is needless to say that the constituent elements (including element steps and the like) are not necessarily essential unless particularly clearly stated or considered to be clear in principle. In addition, when saying "composed of A", "including A", "have A", and "includes A", unless specifically stated that only the element is specified, it is needless to say that elements other than the element are not excluded. Similarly, in the following embodiments, when referring to a shape, a positional relationship, or the like of a constituent element or the like, it is assumed to include those substantially similar or similar to the shape and the like unless particularly clearly stated or considered to be clear in principle.

Configuration Example of Robot System 10 According to Embodiment of Invention

FIG. 1 shows a configuration example of the robot system 10 according to an embodiment of the invention.

The robot system 10 includes a robot 1, a trajectory generation device 11, a work instruction device 12, an imaging device 13, and a control device 14. The trajectory generation device 11, the work instruction device 12, and the control device 14 can be disposed at any desired positions regardless of a position of the robot 1. For example, the trajectory generation device 11 may be disposed on a so-called cloud server. For example, the function of the trajectory generation device 11 may be incorporated in the work instruction device 12 or the control device 14.

The robot 1 is, for example, a multi-joint robot, and includes an arm 2 composed of a plurality of links connected by a plurality of joints, and a suction nozzle 3. The number of joints and links of the robot 1, a link length and a movable range of each link of the robot 1 are recorded in robot shape information 1123 (FIG. 6) to be described later.

The suction nozzle 3 is mounted to a tip end of the arm 2 on which the plurality of links are connected. The suction nozzle 3 has a suction surface which is capable of expanding and contracting in a suction direction, and can suction an object 4 by increasing suction pressure of the suction surface.

FIG. 2 is a diagram for illustrating an outline of a movement of the suction nozzle 3 of the robot 1.

The robot 1 moves a tip end of the suction nozzle 3 from a predetermined start point to a contact point P1 which is assumed to be on an upper surface of the object 4 placed on a mounting table 5. Next, the robot 1 pushes the suction nozzle 3 to a stop point P2 while starting the suction by the suction nozzle 3, and causes the suction nozzle 3 to suction the object 4. Finally, the robot 1 pulls the suction nozzle 3 up to a pulling-up point P3 and then conveys the suction nozzle 3 to a predetermined position. At the contact point P1, the suction nozzle 3 is not stopped but is continuously decelerated from the start point to the stop point P2. Also at the pulling-up point P3, the suction nozzle 3 is not stopped, and is continuously accelerated from the stop point P2 up to a predetermined velocity.

Here, coordinates of the contact point P1 are coordinates of a reference point (for example, a center of the suction surface) set in the suction nozzle 3 when the suction nozzle 3 comes into contact with the object 4. Hereinafter, the contact point P1 is referred to as the first via point P1. A trajectory of the suction nozzle 3 is determined by the trajectory generation device 11 such that a velocity vector of the suction nozzle 3 at the first via point P1 is $V_1$ and an acceleration vector of the suction nozzle 3 at the first via point P1 is $A_1$.

Coordinates of the stop point P2 are, for example, coordinates of a reference point set in the suction nozzle 3 when the suction nozzle 3 is pushed into the object 4. However, since the suction nozzle 3 contracts when the object 4 is suctioned by the suction nozzle 3, in that case, the stop point P2 is not an actual position of the reference point, but the position of the reference point when it is assumed that the suction nozzle 3 does not contract and moves in a downward direction in the drawing. Hereinafter, the stop point P2 is referred to as the second via point P2. The velocity and an acceleration of the suction nozzle 3 are 0 at the second via point P2.

Coordinates of the pulling-up point P3 are coordinates of a reference point set in the suction nozzle 3 when the pulling-up of the object 4 suctioned by the suction nozzle 3 is started. Hereinafter, the pulling-up point P3 is referred to as the third via point P3. The third via point P3 has the same coordinates as the first via point P1. However, the third via point P3 may be set at coordinates different from the first via point P1. The trajectory of the suction nozzle 3 is determined by the trajectory generation device 11 such that the velocity vector and the acceleration vector of the suction nozzle 3 at the third via point P3 are predetermined values $V_3$ and $A_3$ respectively.

In the present embodiment, coordinates and posture of the suction nozzle 3 are represented using x, y, and z coordinates (x, y, z) of the predetermined reference point of the suction nozzle 3 and rotation angles ($\phi$, $\theta$, $\psi$) around x, y, and z axes. The coordinates of the suction nozzle 3 can also be represented using the rotation angles of all joints of the robot.

Return to FIG. 1. The trajectory generation device 11 generates the trajectory of the suction nozzle 3 based on various conditions acquired from the work instruction device 12 and outputs the trajectory to the control device 14. In the present embodiment, the trajectory of the suction nozzle 3 is also referred to as the trajectory of the robot 1.

The work instruction device 12 generates path condition information 1121 and suction condition information 1122 (both in FIG. 3) based on an input from a user, and outputs the generated path condition information 1121 and suction condition information 1122 to the trajectory generation device 11. The path condition information 1121 includes, for example, path condition information including the velocity, the acceleration, a jerk, and the like of the suction nozzle 3 at the respective coordinates and posture of the first via point P1 and the third via point P3 input from the user and suction condition information. The jerk is a value obtained by differentiating the acceleration in a time direction, and is also referred to as jerk. In the present embodiment, capital letters ($A_1$, $V_1$, $J_1$) are vectors representing the acceleration, the velocity, and the jerk, and small letters ($a_1$, $v_1$, $j_1$) are scalars.

The imaging device 13 takes an image so as to include the object 4 at an angle of view, and outputs an image obtained as a result to the work instruction device 12. The work instruction device 12 may set the coordinates and posture of the first via point P1 and the third via point P3 in the path condition information 1121 based on the image input from the imaging device 13.

The control device 14 controls the operation of the robot 1 based on trajectory information input from the trajectory generation device 11.

Configuration Example of Trajectory Generation Device 11

Next, FIG. 3 is a functional block diagram showing a configuration example of the trajectory generation device 11.

The trajectory generation device 11 is, for example, a computer such as a personal computer (PC) including a central processing unit (CPU), a memory, a storage, a communication interface, and the like. The trajectory generation device 11 includes a control unit 111, a storage unit 112, an input unit 113, a display unit 114, and a communication unit 115.

The control unit 111 includes functional blocks of a path condition acquisition unit 1111, a suction condition acquisition unit 1112, a path condition re-calculation unit 1113, a trajectory generation unit 1114, a pressurization distance and coordinate calculation unit 1115, a pressurization time calculation unit 1116, a pulling-up time calculation unit 1117, a stop time calculation unit 1118 and a display control unit 1119. Each functional block of the control unit 111 is realized by the CPU of the PC executing a predetermined program.

The path condition acquisition unit 1111 acquires the path condition information 1121 from the work instruction device 12 and stores the path condition information 1121 in the storage unit 112. The suction condition acquisition unit 1112 acquires the suction condition information 1122 from the work instruction device 12 and stores the acquired suction condition information 1122 in the storage unit 112.

The path condition re-calculation unit 1113 determines whether the velocity vector $V_1$, the acceleration vector $A_1$, a jerk vector $J_1$ at the first via point P1, and the velocity vector $V_3$, the acceleration vector $A_3$, and a jerk vector $J_3$ at the third via point P3 recorded in the path condition information 1121 acquired from the work instruction device 12 are appropriate (details will be described later). When the path condition re-calculation unit 1113 determines that these vectors are inappropriate, the path condition re-calculation unit 1113 corrects the vectors which are determined to be inappropriate, among the velocity vector $V_1$, the acceleration vector $A_1$, a jerk vector $J_1$ at the first via point P1, and the velocity vector $V_3$, the acceleration vector $A_3$, and a jerk vector $J_3$ at the third via point P3 recorded in the path condition information 1121, and updates the path condition information 1121 of the storage unit 112.

The trajectory generation unit 1114 generates the trajectory of the suction nozzle 3 based on the path condition information 1121 and the robot shape information 1123 stored in the storage unit 112. Specifically, the trajectory of the suction nozzle 3 from the predetermined start point to the end point via the first via point P1, the second via point P2 and the third via point P3 is generated so as to satisfy each condition of the velocity vector $V_1$ and the acceleration vector $A_1$ of the suction nozzle 3 at the first via point P1, and the velocity vector being 0 and the acceleration vector being 0 of the suction nozzle 3 at the second via point P2, and the velocity vector $V_3$ and the acceleration vector $A_3$ of the suction nozzle 3 at the third via point P3. An existing method can be used for trajectory generation by the trajectory generation unit 1114.

The pressurization distance and coordinate calculation unit 1115 calculates a pressurization distance $x_2$ from the first via point P1, which is the start of suction of the suction nozzle 3, to the second via point P2, and the coordinates of the second via point P2, based on the path condition information 1121 stored in the storage unit 112.

The pressurization time calculation unit 1116 calculates pressurization time $t_1$ necessary for increasing the suction pressure of the suction nozzle 3, which is movement time of the suction nozzle 3 from the first via point P1 to the second via point P2.

The pulling-up time calculation unit 1117 calculates pulling-up time $t_3$ for moving the suction nozzle 3 from the second via point P2 to the third via point P3.

The stop time calculation unit 1118 calculates stop time $t_2$ during which the suction nozzle 3 is stopped at the second via point P2, based on the pressurization time $t_1$, the pulling-up time $t_3$, and suction time $t_v$ included in the suction condition information 1122.

The display control unit 1119 controls display of an output screen 50 (FIG. 14) or the like on the display unit 114.

The storage unit 112 stores the path condition information 1121, the suction condition information 1122, the robot shape information 1123, and upper limit value information 1124. The path condition information 1121, the suction condition information 1122, the robot shape information 1123, and the upper limit value information 1124 are stored in the storage unit 112 in advance or input by the user. The storage unit 112 is realized by, for example, the storage or the memory of the PC.

The input unit 113 receives various operations from the user. The input unit 113 is, for example, an input device such as a keyboard and a mouse included in the PC.

The display unit 114 displays, for example, the output screen 50 (FIG. 14) under the control of the display control unit 1119. The display unit 114 is, for example, a display included in the PC.

The communication unit 115 communicates with the work instruction device 12 and the control device 14 via a predetermined network. The communication unit 115 is, for example, a communication interface included in the PC.

Next, FIG. 4 shows an example of the path condition information 1121.

In the path condition information 1121, coordinates and posture ($x_1$, $y_1$, $z_1$, $\phi_1$, $\theta_1$, $\psi_1$), the velocity vector $V_1$, the acceleration vector $A_1$, the jerk vector $J_1$, a maximum acceleration $A_{1max}$, and a maximum jerk $J_{1max}$ at the first via point P1 of the suction nozzle 3 are recorded. In addition, in the path condition information 1121, coordinates and posture ($x_3$, $y_3$, $z_3$, $\phi_3$, $\theta_3$, $\psi_3$), the velocity vector $V_3$, the acceleration vector $A_3$, the jerk vector $J_3$, a maximum acceleration $A_{3max}$, and a maximum jerk $J_{3max}$ at the third via point P3 are recorded.

However, maximum accelerations and maximum jerks at the first via point P1 and the third via point P3 may be changed in accordance with mass and a suction surface state of the object 4 and the coordinates and posture and an acceleration direction of the suction nozzle 3. Here, the suction surface state indicates the texture such as fine irregularities on the suction surface, and whether the suction surface is wet.

Next, FIG. 5 shows an example of the suction condition information 1122. In the suction condition information 1122, the suction time $t_v$ (=t+α) obtained by adding a margin α to the time t required for the suction nozzle 3 to reach a predetermined suction pressure is recorded.

Next, FIG. 6 shows an example of the robot shape information 1123. In the robot shape information 1123, the link length [mm], the movable range [degree], and a model name of a plurality of links (6 in FIG. 6) of the robot 1 are recorded.

Next, FIG. 7 shows an example of the upper limit value information 1124. In the upper limit value information 1124, an acceleration upper limit value and a jerk upper limit value are recorded in association with various combinations of weight of the object 4 and the coordinates and posture and the acceleration direction of the suction nozzle 3 are recorded.

The path condition re-calculation unit 1113 can correct, based on the upper limit value information 1124, at least one piece of the path condition information 1121 of the storage unit 112 when one vector among the velocity vector $V_1$, the acceleration vector $A_1$, the jerk vector $J_1$ at the first via point P1, and the velocity vector $V_3$, the acceleration vector $A_3$, and the jerk vector $J_3$ at the third via point P3 included in the path condition information 1121 exceeds the upper limit value.

Trajectory of Suction Nozzle 3

Next, the trajectory along which the suction nozzle 3 sequentially moves from the first via point P1 to the second via point P2, and to the third via point P3 will be described with reference to FIGS. 8A to 8D and 9A to 9D.

FIGS. 8A to 8D are diagrams for illustrating an example of a trajectory when the suction nozzle 3 pushes the object 4 from the first via point P1 to the second via point P2.

In the example of FIGS. 8A to 8D, in order to simplify the description, among the x, y, and z coordinates, only movement in an x direction (downward direction in FIG. 2) will be described, but a y direction and a z direction may be treated in the same manner as the x direction. The movement in the y direction and the z direction may be regarded as 0. Further, in the present embodiment, a jerk j of the suction nozzle 3 is set to be a constant value, but the jerk j of the suction nozzle 3 is not limited to the constant value.

FIG. 8A shows a time-series change of the x-coordinate of the suction nozzle 3, and a horizontal axis shows time and a vertical axis shows the x-coordinate. $t_1$ in the horizontal axis is time for the suction nozzle 3 to reach the second via point P2 from the first via point P1. When the x-coordinate of the first via point P1 is 0 and the x-coordinate of the second via point P2 is $x_2$, the x-coordinate of the suction nozzle 3 changes, for example, according to the following Formula 1.

[Math 1]

$$x = \frac{1}{6}j_1 t^3 + \frac{1}{2}a_1 t^2 + v_1 t \tag{1}$$

FIG. 8B shows a time-series change of a velocity v of the suction nozzle 3, and the horizontal axis represents time and the vertical axis represents the velocity v. When the velocity at the first via point P1 is $v_1$ and the velocity at the second via point P2 is 0, the velocity v of the suction nozzle 3 changes, for example, according to the following Formula 2.

[Math 2]

$$v = \frac{1}{2}j_1 t^2 + a_1 t + v_1 \quad (v_1 > 0) \tag{2}$$

FIG. 8C shows a time-series change of an acceleration a of the suction nozzle 3, and the horizontal axis represents time and the vertical axis represents the acceleration a. When the acceleration at the first via point P1 is $a_1$ and the acceleration at the second via point P2 is 0, the acceleration a of the suction nozzle 3 changes, for example, according to the following Formula 3.

[Math 3]

$$a = j_1 t + a_1 (a_1 < 0) \tag{3}$$

FIG. 8D shows a time-series change of the jerk j of the suction nozzle 3, the horizontal axis represents time and the vertical axis represents the jerk j. In the case of the present embodiment, as described above, the jerk j is the constant value $j_1$ as shown in the following Formula 4 and does not change.

[Math 4]

$$j = j_1 (j_1 > 0) \tag{4}$$

The time for the suction nozzle 3 to move from the first via point P1 to the second via point P2 ($x=x_2$) is $t_1$, and the velocity and the acceleration at the second via point P2 are 0. Therefore, $t=t_1$, $a=0$ are substituted into the Formula 3 to obtain the following Formula 5.

[Math 5]

$$t_1 = -\frac{a_1}{j_1} \tag{5}$$

Further, Formula 5 is substituted into Formula 2 to obtain the following Formula 6.

[Math 6]

$$v_1 = \frac{a_1^2}{2j_1} \tag{6}$$

Further, $t=t_1$, $x=x_2$, Formula 5, and Formula 6 are substituted into Formula 1 to obtain the following Formula 7.

[Math 7]

$$x_2 = -\frac{a_1^3}{6j_1^2} \quad (7)$$

Next, FIGS. 9A to 9D are diagrams for illustrating an example of a trajectory when the suction nozzle 3 pulls up the object 4 from the second via point P2 to the third via point P3.

In the example of FIGS. 9A to 9D, similar to the example of FIGS. 8A to 8D, in order to simplify the description, among the x, y, and z coordinates, only the movement in the x direction (downward direction in FIG. 2) will be described, but the y direction and the z direction maybe treated in the same manner as the x direction. The movement in the y direction and the z direction may be regarded as 0.

FIG. 9A shows a t₁me-series change of the x-coordinate of the suction nozzle 3, and the horizontal axis represents time and the vertical axis represents the x-coordinate. $t_3$ in the horizontal axis is time for the suction nozzle 3 to reach the third via point P3 from the second via point P2. When the x-coordinate of the second via point P2 is $x_2$ and the x-coordinate of the third via point P3 is 0, the x-coordinate of the suction nozzle 3 changes, for example, according to the following Formula 8.

[Math 8]

$$x = \frac{1}{6}j_3 t^3 + x_2 \quad (x_2 > 0) \quad (8)$$

FIG. 9B shows a time-series change of the velocity v of the suction nozzle 3, and the horizontal axis represents time and the vertical axis represents the velocity v. When the velocity at the second via point P2 is 0 and the velocity at the third via point P3 is $v_3$, the velocity v of the suction nozzle 3 changes, for example, according to the following Formula 9.

[Math 9]

$$v = \frac{1}{2}j_3 t^2 \quad (v_3 < 0) \quad (9)$$

FIG. 9C shows a time-series change of the acceleration a of the suction nozzle 3, and the horizontal axis represents time and the vertical axis represents the acceleration a. When the acceleration at the second via point P2 is 0 and the acceleration at the third via point P3 is $a_3$, the acceleration a of the suction nozzle 3 changes, for example, according to the following Formula 10.

[Math 10]

$$a = j_3 t \, (a_3 < 0) \quad (10)$$

FIG. 9D shows a time-series change of the jerk j of the suction nozzle 3, the horizontal axis represents time and the vertical axis represents the jerk j. In the case of the present embodiment, as described above, the jerk j is a constant value $j_3$ as shown in the following Formula 11 and does not change.

[Math 11]

$$j = j_3 (j_3 < 0) \quad (11)$$

The time for the suction nozzle 3 to move from the second via point P2 to the third via point P3 (x=0) is $t_3$, and the velocity at the third via point P3 is $v_3$, and the acceleration at the third via point P3 is $a_3$. Therefore, $t=t_3$, $x=0$ are substituted into the Formula 8 to obtain the following Formula 12.

[Math 12]

$$t_3 = \sqrt[3]{-\frac{6x_2}{j_3}} \quad (12)$$

Therefore, $t=t_3$, $a=a_3$ are substituted into the Formula 10 to obtain the following Formula 13.

[Math 13]

$$t_3 = \frac{a_3}{j_3} \quad (13)$$

Further, $t=t_3$, $v=v_3$, and Formula 13 are substituted into Formula 9 to obtain the following Formula 14.

[Math 14]

$$v_3 = \frac{a_3^2}{2j_3} \quad (14)$$

Trajectory Generation Processing by Trajectory Generation Device 11

Next, FIG. 10 is a flowchart illustrating an example of the trajectory generation processing by the trajectory generation device 11.

The trajectory generation processing is started, for example, in accordance with a predetermined start operation from the user or a signal issued when the presence of the object 4 is detected by the imaging device 13.

First, the path condition acquisition unit 1111 acquires the path condition information 1121 from the storage unit 112 (step S1). Next, the suction condition acquisition unit 1112 acquires the suction condition information 1122 from the storage unit 112 (step S2).

Next, the path condition re-calculation unit 1113 performs path condition re-calculation processing (step S3). Specifically, the path condition re-calculation unit 1113 determines whether the velocity vector $V_1$, the acceleration vector $A_1$, the jerk vector $J_1$ at the first via point P1, and the velocity vector $V_3$, the acceleration vector $A_3$, and the jerk vector $J_3$ at the third via point P3 included in the path condition information 1121 are appropriate.

When the path condition re-calculation unit 1113 determines that vectors are not appropriate, the path condition re-calculation unit 1113 corrects the velocity vector $V_1$, the acceleration vector $A_1$, the jerk vector $J_1$ at the first via point P1, and the velocity vector $V_3$, the acceleration vector $A_3$, and the jerk vector $J_3$ at the third via point P3 included in the path condition information 1121, and updates the path condition information 1121 of the storage unit 112.

Here, the path condition re-calculation processing in step S3 will be described in detail with reference to FIGS. 11 and 12.

FIG. 11 is a flowchart illustrating an example of the path condition re-calculation processing at the time of pushing the object 4 from the first via point P1 to the second via point P2 in the path condition re-calculation processing in step S3.

First, the path condition re-calculation unit 1113 determines whether the jerk $j_1$ recorded in the path condition information 1121 is equal to or less than a maximum jerk $j_{1max}$ (step S11). Here, when the path condition re-calculation unit 1113 determines that the jerk $j_1$ is not the maximum jerk $j_{1max}$ or less (No in step S11), the path condition re-calculation unit 1113 corrects the jerk $j_1$ to the maximum jerk $j_{1max}$ and updates the path condition information 1121 of the storage unit 112 (step S12).

On the contrary, when the path condition re-calculation unit 1113 determines that the jerk $j_1$ is equal to or less than the maximum jerk $j_{1max}$ (Yes in step S11), the processing skips step S12 and proceeds to step S13.

Next, the path condition re-calculation unit 1113 determines whether the acceleration a1 recorded in the path condition information 1121 is equal to or less than a maximum acceleration $a_{1max}$ (step S13). Here, when the path condition re-calculation unit 1113 determines that the acceleration $a_1$ is not the maximum acceleration $a_{1max}$ or less (No in step S13), the path condition re-calculation unit 1113 corrects the acceleration a1 to the maximum acceleration $a_{1max}$, and updates the path condition information 1121 of the storage unit 112 (step S14).

On the contrary, when the path condition re-calculation unit 1113 determines that the acceleration $a_1$ is equal to or less than the maximum acceleration $a_1$. (Yes in step S13), the processing skips step S14 and proceeds to step S15.

Next, the path condition re-calculation unit 1113 substitutes the appropriately corrected jerk $j_1$ and acceleration $a_1$ into the Formula 6 to calculate the velocity $v_1$ and compares the velocity $v_1$ with the velocity $v_1$ recorded in the path condition information 1121 (step S15).

When the path condition re-calculation unit 1113 determines that the velocity $v_1$ recorded in the path condition information 1121 is smaller than the velocity $v_1$ calculated from the Formula 6 (<in step S15), the path condition re-calculation unit 1113 corrects the acceleration $a_1$ to $\sqrt{(2j_1v_1)}$ so as to satisfy the Formula 6, and updates the path condition information 1121 of the storage unit 112 (step S16).

On the contrary, when the path condition re-calculation unit 1113 determines that the velocity $v_1$ recorded in the path condition information 1121 is larger than the velocity $v_1$ calculated from the Formula 6 (>in step S15), the path condition re-calculation unit 1113 corrects the velocity $v_1$ to the velocity $v_1$ calculated from the Formula 6, and updates the path condition information 1121 of the storage unit 112 (step S17).

Further, when the path condition re-calculation unit 1113 determines that the velocity $v_1$ recorded in the path condition information 1121 is equal to the velocity $v_1$ calculated from the Formula 6 (=in step S15), the processing skips steps S16 and S17, and the path condition re-calculation processing at the time of pushing is ended.

Next, FIG. 12 is a flowchart illustrating an example of the path condition re-calculation processing at the time of pulling-up the object 4 from the second via point P2 to the third via point P3 in the path condition re-calculation processing in step S3.

First, the path condition re-calculation unit 1113 determines whether the jerk $j_3$ recorded in the path condition information 1121 is equal to or less than $-j_{3max}$ obtained by multiplying the maximum jerk $j_{3max}$ by $-1$ (step S21). Here, when the path condition re-calculation unit 1113 determines that the jerk $j_3$ is equal to or less than $-j_{3max}$ (Yes in step S21), the path condition re-calculation unit 1113 corrects the jerk $j_3$ to $-j_{3max}$, and updates the path condition information 1121 of the storage unit 112 (step S22).

On the contrary, when the path condition re-calculation unit 1113 determines that the jerk $j_3$ is not $-j_{3max}$ or less (No in step S21), the processing skips step S22 and proceeds to step S23.

Next, the path condition re-calculation unit 1113 determines whether an acceleration $a_3$ recorded in the path condition information 1121 is equal to or less than $-a_{3max}$ obtained by multiplying the maximum acceleration $a_{3max}$ by $-1$ (step S23). Here, when the path condition re-calculation unit 1113 determines that the acceleration $a_3$ is equal to or less than $-a_{3max}$ (Yes in step S23), the path condition re-calculation unit 1113 corrects the acceleration $a_3$ to $-a_{3max}$, and updates the path condition information 1121 of the storage unit 112 (step S24).

On the contrary, when the path condition re-calculation unit 1113 determines that the acceleration $a_3$ is not $-a_{3max}$ or less than (No in step S23), the processing skips step S24 and proceeds to step S25.

Next, the path condition re-calculation unit 1113 substitutes the appropriately corrected jerk $j_3$ and acceleration $a_3$ into the Formula 14 to calculate the velocity $v_3$ and compares the velocity $v_3$ with the velocity $v_3$ recorded in the path condition information 1121 (step S25).

When the path condition re-calculation unit 1113 determines that the velocity $v_3$ recorded in the path condition information 1121 is larger than the velocity $v_3$ calculated from the Formula 14 (>in step S25), the path condition re-calculation unit 1113 corrects the acceleration $a_3$ to $\sqrt{(2j_3v_3)}$ so as to satisfy the Formula 14, and updates the path condition information 1121 of the storage unit 112 (step S26).

On the contrary, when the path condition re-calculation unit 1113 determines that the velocity $v_3$ recorded in the path condition information 1121 is smaller than the velocity $v_3$ calculated from the Formula 14 (<in step S25), the path condition re-calculation unit 1113 corrects the velocity $v_3$ to the velocity $v_3$ calculated from the Formula 14, and updates the path condition information 1121 of the storage unit 112 (step S27).

Further, when the path condition re-calculation unit 1113 determines that the velocity $v_3$ recorded in the path condition information 1121 is equal to the velocity $v_3$ calculated from the Formula 14 (=in step S25), the processing skips steps S26 and S27, and the path condition re-calculation processing at the time of pulling-up is ended.

After the path condition information 1121 stored in the storage unit 112 is corrected and updated as appropriate by the path condition re-calculation processing described above, the processing proceeds to step S4 in FIG. 10.

Return to FIG. 10. The pressurization distance and coordinate calculation unit 1115 calculates the pressurization distance $x_2$ and the coordinates of the second via point P2 (step S4), based on the path condition information 1121 stored in the storage unit 112.

Specifically, the pressurization distance and coordinate calculation unit 1115 calculates the pressurization distance $x_2$ according to with Formula 7. Further, as shown in the following Formula 15, the pressurization distance and coordinate calculation unit 1115 calculates the coordinates ($x_2$, $y_2$, $z_2$) of the second via point P2 by moving the coordinates ($x_1$, $y_1$, $z_1$) of the first via point P1 only by the pressurization distance $x_2$ in the direction of the velocity vector $V_1$ at the first via point P1.

[Math 15]

$$X_2 = (x_2, y_2, z_2) \\ = (x_1, y_1, z_1) - \frac{a_1^3}{6f_1^2} \cdot \frac{1}{|V_1|}(v_{1x}, v_{1y}, v_{1z}) \quad (15)$$

In the Formula, the velocity vector $V_1$ at the first via point P1 is as shown in the following Formula 16.

[Math 16]

$$V_1 = (v_{1x}, v_{1y}, v_{1z}) \quad (16)$$

Next, the trajectory generation unit 1114 generates a trajectory of the suction nozzle 3 from the predetermined start point to the end point via the first via point P1, the second via point P2, and the third via point P3 based on the path condition information 1121 and the robot shape information 1123 stored in the storage unit 112 (step S5).

Next, the pressurization time calculation unit 1116 calculates the pressurization time $t_1$ using Formula 5 based on the path condition information 1121 stored in the storage unit 112 (step S6).

Next, the pulling-up time calculation unit 1117 calculates the pulling-up time $t_3$ using Formula 12 based on the path condition information 1121 stored in the storage unit 112 (step S7).

Next, based on the pressurization time $t_1$, the pulling-up time $t_3$, and the suction time $t_v$ included in the suction condition information 1122, the stop time calculation unit 1118 calculates the stop time $t_2$ for stopping the suction nozzle 3 at the second via point P2 (step S8).

Next, FIG. 13 is a flowchart illustrating an example of stop time calculation processing in step S8.

First, the stop time calculation unit 1118 determines whether an added value ($t_1+t_3$) of the pressurization time $t_1$ and the pulling-up time $t_3$ is equal to or less than the suction time $t_v$ (step S31). Here, when the stop time calculation unit 1118 determines that the added value ($t_1+t_3$) is not the suction time $t_v$ or less (No in step S31), the stop time calculation unit 1118 sets the stop time $t_2$ to 0 (step S32).

On the contrary, when the stop time calculation unit 1118 determines that the added value ($t_1+t_3$) is equal to or less than the suction time $t_v$ (Yes in step S31), the stop time calculation unit 1118 calculates a value obtained by subtracting the added value ($t_1+t_3$) from the suction time $t_v$ as the stop time $t_2$ (step S32). The stop time calculation processing in step S8 is then ended.

Return to FIG. 10. Finally, the communication unit 115 transmits the trajectory generated in step S5, the pressurization time $t_1$ calculated in step S6, the pulling-up time $t_3$ calculated in step S7, and the stop time $t_2$ calculated in step S8 to the control device 14 (step S9). The control device 14 controls the robot 1 based on the trajectory, the pressurization time $t_1$, the pulling-up time $t_3$, and the stop time $t_2$ transmitted from the trajectory generation device 11. The trajectory generation processing is then ended.

According to the trajectory generation processing described above, in the trajectory from the predetermined start point to the end point via the first via point P1, the second via point P2, and the third via point P3, a trajectory which continuously decelerates from the first via point P1 to the second via point P2 without stopping at the first via point P1 and continuously accelerates from the second via point P2 to the third via point P3 without stopping at the third via point P3 can be generated.

The velocity vector and the acceleration vector at each of the first via point P1 and the third via point P3 set by the user can be appropriately corrected so as not to exceed upper limits.

Further, since the suction of the suction nozzle 3 is started from the first via point P1 and moved to the second via point P2, the stop time $t_2$ at the second via point P2 can be shortened as much as possible. Therefore, it is possible to shorten the time required for the series of object suction operations.

Display Example of Output Screen 50

Next, FIG. 14 shows the display example of the output screen 50 displayed on the display unit 114 of the trajectory generation device 11.

On the output screen 50, a trajectory parameter display area 51, a generated trajectory display area 52, and a display switching button 53 are provided.

In the trajectory parameter display area 51, the coordinates, the velocity vector, the acceleration vector, and pushing time (pressurization time $t_1$) at the first via point P1, the coordinates and the stop time $t_2$ of the second via point P2, and the coordinates, the velocity vector, the acceleration vector, and the pulling-up time $t_3$ at the third via point P3 are displayed.

In the generated trajectory display area 52, the time-series changes of the position, the velocity, the acceleration, and the jerk of the suction nozzle 3 generated by the trajectory generation unit 1114 are displayed.

Every time the user operates the display switching button 53, the display in the trajectory parameter display area 51 and the generated trajectory display area 52 can be switched between the display set by the user before the correction and the display corrected by the path condition re-calculation unit 1113.

By looking at the trajectory parameter display area 51 and the generated trajectory display area 52 in which the display is switched by operating the display switching button 53, the user can check whether the velocity and the acceleration set by the user himself/herself are appropriate (corrected or not). It is possible to know the time required for the series of object suction operations (an added value of the pushing time (pressurization time $t_1$), the stop time $t_2$, and the pulling-up time $t_3$).

The user can intuitively grasp the movement of the suction nozzle 3 by looking at the generated trajectory display area 52.

The invention is not limited to the above embodiments and modifications, and includes various modifications. For example, the embodiments described above are described in detail for easy understanding of the invention, and the invention is not necessarily limited to the embodiment including all the constituent elements described above. A part of the configuration of a certain embodiment can be replaced with the configuration of another embodiment, and the configuration of another embodiment can be added to the configuration of the certain embodiment. It is possible to add, delete, and replace other configurations for a part of the configuration of each embodiment.

REFERENCE SIGN LIST

1: robot
2: arm
3: suction nozzle
4: object
5: mounting table
10: robot system
11: trajectory generation device
12: work instruction device
13: imaging device
14: control device
50: output screen
51: trajectory parameter display area
52: generated trajectory display area
53: display switching button
111: control unit
112: storage unit
113: input unit
114: display unit
115: communication unit
1111: path condition acquisition unit
1112: suction condition acquisition unit
1113: path condition re-calculation unit
1114: trajectory generation unit
1115: pressurization distance and coordinate calculation unit
1116: pressurization time calculation unit
1117: time calculation unit
1118: stop time calculation unit
1119: display control unit
1121: path condition information
1122: suction condition information
1123: robot shape information
1124: upper limit value information

The invention claimed is:

1. A trajectory generation device configured to generate a trajectory of a robot for conveying an object, the trajectory generation device comprising:
a path condition acquisition unit configured to acquire path condition information including at least coordinates of a first via point which is a position of a reference point of a suction nozzle of the robot when the suction nozzle comes into contact with the object, and a velocity, an acceleration, and a jerk of the suction nozzle at the first via point;
a pressurization distance and coordinate calculation unit configured to calculate coordinates of a second via point which is a position of the reference point when the suction nozzle is pushed into the object, based on the path condition information; and
a trajectory generation unit configured to generate the trajectory of the suction nozzle which satisfies the path condition information and reaches an end point from a predetermined start point via the first via point and the second via point,
wherein the path condition information further includes a maximum acceleration and a maximum jerk of the suction nozzle at the first via point,
wherein the trajectory generation device further comprises:
a path condition re-calculation unit configured to correct the velocity, the acceleration, and the jerk at the first via point included in the path condition information based on the maximum acceleration and the maximum jerk of the suction nozzle at the first via point included in the path condition information.

2. The trajectory generation device according to claim 1, wherein
the path condition acquisition unit is configured to acquire the path condition information further including a velocity, an acceleration, and a jerk of the suction nozzle at a third via point which is a position of the reference point when pulling-up of the object suctioned by the suction nozzle is started, and
the trajectory generation unit is configured to generate the trajectory of the suction nozzle which satisfies the path condition information and reaches the end point from the predetermined start point via the first via point, the second via point, and the third via point.

3. The trajectory generation device according to claim 2, further comprising:
a suction condition acquisition unit configured to acquire suction condition information indicating a suction time required for the suction nozzle to reach a predetermined suction pressure; and
a stop time calculation unit configured to calculate a stop time at the second via point based on the suction condition information.

4. The trajectory generation device according to claim 3, further comprising:
a pressurization time calculation unit configured to calculate a pressurization time necessary for increasing a suction pressure of the suction nozzle, which is a movement time of the suction nozzle from the first via point to the second via point, based on the path condition information; and
a pulling-up time calculation unit configured to calculate a pulling-up time for moving the suction nozzle from the second via point to the third via point based on the path condition information, wherein
the stop time calculation unit is configured to calculate the stop time at the second via point based on the suction time indicated by the suction condition information, the pressurization time, and the pulling-up time.

5. The trajectory generation device according to claim 3, further comprising:
a display control unit configured to display an output screen including the calculated stop time.

6. The trajectory generation device according to claim 1, wherein
the path condition information further includes a maximum acceleration and a maximum jerk of the suction nozzle at the third via point, and
the path condition re-calculation unit is configured to correct the velocity, the acceleration, or the jerk at the third via point included in the path condition information based on the maximum acceleration and the maximum jerk of the suction nozzle at the third via point included in the path condition information.

7. The trajectory generation device according to claim 6, wherein
the path condition re-calculation unit is configured to correct at least one of the maximum acceleration and the maximum jerk of the suction nozzle at the first via point, and the maximum acceleration and the maximum jerk of the suction nozzle at the third via point included in the path condition information, in accordance with at least one of a mass and a suction surface state of the object, coordinates and posture of the suction nozzle, and an acceleration direction of the suction nozzle.

8. A trajectory generation method by a trajectory generation device configured to generate a trajectory of a robot for conveying an object, the trajectory generation method comprising:
- a path condition acquiring step of acquiring path condition information including at least coordinates of a first via point which is a position of a reference point of a suction nozzle of the robot when the suction nozzle comes into contact with the object, and a velocity, an acceleration, and a jerk of the suction nozzle at the first via point;
- a pressurization distance and coordinate calculation step of calculating coordinates of a second via point which is a position of the reference point when the suction nozzle is pushed into the object, based on the path condition information; and
- a trajectory generation step of generating the trajectory of the suction nozzle which satisfies the path condition information and reaches an end point from a predetermined start point via the first via point and the second via point,
- wherein the path condition information further includes a maximum acceleration and a maximum jerk of the suction nozzle at the first via point,
- wherein the trajectory generation device further comprises:
- a path condition re-calculation unit configured to correct the velocity, the acceleration, and the jerk at the first via point included in the path condition information based on the maximum acceleration and the maximum jerk of the suction nozzle at the first via point included in the path condition information.

9. A non-transitory computer readable medium storing a program, the program causing a computer to function as:
- a path condition acquisition unit configured to acquire path condition information including at least coordinates of a first via point which is a position of a reference point of a suction nozzle of a robot when the suction nozzle comes into contact with an object, and a velocity, an acceleration, and a jerk of the suction nozzle at the first via point;
- a pressurization distance and coordinate calculation unit configured to calculate coordinates of a second via point which is a position of the reference point when the suction nozzle is pushed into the object, based on the path condition information; and
- a trajectory generation unit configured to generate the trajectory of the suction nozzle which satisfies the path condition information and reaches an end point from a predetermined start point via the first via point and the second via point,
- wherein the path condition information further includes a maximum acceleration and a maximum jerk of the suction nozzle at the first via point,
- wherein the trajectory generation device further comprises:
- a path condition re-calculation unit configured to correct the velocity, the acceleration, and the jerk at the first via point included in the path condition information based on the maximum acceleration and the maximum jerk of the suction nozzle at the first via point included in the path condition information.

10. A robot system comprising:
- a robot configured to convey an object;
- a trajectory generation device configured to generate a trajectory of the robot; and
- a control device configured to control the robot based on the generated trajectory, wherein the robot includes a suction nozzle configured to suction the object at a tip end of a link,
- wherein the trajectory generation device comprises:
- a path condition acquisition unit configured to acquire path condition information including at least coordinates of a first via point which is a position of a reference point of the suction nozzle when the suction nozzle comes into contact with the object, and a velocity, an acceleration, and a jerk of the suction nozzle at the first via point;
- a pressurization distance and coordinate calculation unit configured to calculate coordinates of a second via point which is a position of the reference point when the suction nozzle is pushed into the object, based on the path condition information; and
- a trajectory generation unit configured to generate the trajectory of the suction nozzle which satisfies the path condition information and reaches an end point from a predetermined start point via the first via point and the second via point,
- wherein the path condition information further includes a maximum acceleration and a maximum jerk of the suction nozzle at the first via point,
- wherein the trajectory generation device further comprises:
- a path condition re-calculation unit configured to correct the velocity, the acceleration, and the jerk at the first via point included in the path condition information based on the maximum acceleration and the maximum jerk of the suction nozzle at the first via point included in the path condition information.

11. The robot system according to claim 10, further comprising:
- an imaging device configured to take an image including the object at an angle of view; and
- a work instruction device configured to set coordinates of the first via point based on the image.

* * * * *